United States Patent
Cunningham et al.

(10) Patent No.: US 10,017,182 B2
(45) Date of Patent: Jul. 10, 2018

(54) SYSTEM AND METHOD FOR CONTROLLING A TORQUE CONVERTER CLUTCH

(71) Applicant: Ford Global Technologies, LLC, Dearborn, MI (US)

(72) Inventors: Ralph Wayne Cunningham, Milan, MI (US); Ross Dykstra Pursifull, Dearborn, MI (US); Donald J. Lewis, Bath Springs, TN (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 15/195,652

(22) Filed: Jun. 28, 2016

(65) Prior Publication Data
US 2017/0369064 A1 Dec. 28, 2017

(51) Int. Cl.
| | | |
|---|---|---|
| *B60W 10/02* | (2006.01) | |
| *B60W 30/18* | (2012.01) | |
| *F16H 61/14* | (2006.01) | |
| *B60W 10/11* | (2012.01) | |
| *B60W 10/184* | (2012.01) | |
| *B60W 10/06* | (2006.01) | |

(52) U.S. Cl.
CPC .... *B60W 30/18027* (2013.01); *B60W 10/026* (2013.01); *B60W 10/06* (2013.01); *B60W 10/11* (2013.01); *B60W 10/184* (2013.01); *B60W 30/18* (2013.01); *F16H 61/143* (2013.01); *B60W 2520/04* (2013.01); *B60W 2520/10* (2013.01); *B60W 2540/10* (2013.01); *B60W 2550/142* (2013.01); *B60W 2710/024* (2013.01); *B60W 2710/0666* (2013.01)

(58) Field of Classification Search
None
See application file for complete search history.

(56) References Cited

U.S. PATENT DOCUMENTS

| | | |
|---|---|---|
| 5,002,170 A | 3/1991 | Parsons et al. |
| 5,035,308 A | 7/1991 | Baba et al. |
| 5,133,232 A | 7/1992 | Kikuchi et al. |
| 5,211,270 A | 5/1993 | Tamura et al. |
| 5,314,050 A | 5/1994 | Slicker et al. |
| 5,329,770 A | 7/1994 | Ward |

(Continued)

FOREIGN PATENT DOCUMENTS

| | | |
|---|---|---|
| EP | 1160119 A1 | 5/2001 |
| EP | 2055558 A2 | 10/2008 |
| WO | 8501779 | 4/1985 |

OTHER PUBLICATIONS

Cunningham, Ralph Wayne, et al., "Methods and System for Decelerating a Vehicle," U.S. Appl. No. 15/170,014, filed Jun. 1, 2016, 39 pages.

(Continued)

*Primary Examiner* — Dirk Wright
(74) *Attorney, Agent, or Firm* — Julia Voutyras; McCoy Russell LLP

(57) ABSTRACT

Methods and systems for operating a torque converter clutch of an automatic transmission are presented. In one non-limiting example, the torque converter clutch is closed to provide a threshold torque capacity during a vehicle launch. If an engine torque request is less than the threshold torque capacity, the torque converter clutch remains closed.

20 Claims, 4 Drawing Sheets

(56) References Cited

U.S. PATENT DOCUMENTS

| | | | |
|---|---|---|---|
| 5,795,262 A | 8/1998 | Robinson | |
| 6,042,507 A | 3/2000 | Genise et al. | |
| 7,769,517 B2 | 8/2010 | Segawa et al. | |
| 8,070,653 B2 * | 12/2011 | Swank | B60W 10/02 477/180 |
| 8,131,430 B2 | 3/2012 | Lecointre et al. | |
| 8,374,759 B2 | 2/2013 | Arlauskas et al. | |
| 8,401,768 B2 | 3/2013 | Lewis et al. | |
| 9,002,600 B2 | 4/2015 | Gibson et al. | |
| 2006/0111220 A1 | 5/2006 | Ogawa et al. | |
| 2008/0172161 A1 | 7/2008 | Kondo et al. | |
| 2011/0039657 A1 | 2/2011 | Gibson et al. | |
| 2013/0234164 A1 | 9/2013 | Nagasawa et al. | |
| 2013/0296100 A1 | 11/2013 | Nefey et al. | |

OTHER PUBLICATIONS

Pursifull, Ross Dykstra, et al., "System and Method for Driving Vehicle Accessories," U.S. Appl. No. 15/195,725, filed Jun. 28, 2016, 42 pages.

\* cited by examiner

SYSTEM AND METHOD FOR CONTROLLING A TORQUE CONVERTER CLUTCH

BACKGROUND/SUMMARY

A transmission may include a torque converter. The torque converter provides a fluidic coupling between a torque source such as an engine and a transmission input shaft. The torque converter allows the engine to idle without having to rotate wheels of a vehicle while the transmission is engaged in drive mode. The torque converter also multiplies torque input to the torque converter when there is a speed difference between a torque converter impeller and a torque converter turbine. However, the torque converter may transfer power from the torque source to the transmission less efficiently than is desired. Consequently, vehicle fuel economy may be less than is desired.

The inventors herein have recognized the above-mentioned issues and have developed a method for operating a driveline of a vehicle, comprising: adjusting a torque capacity of a torque converter clutch to provide a non-zero torque capacity in response to a vehicle speed of zero; and opening the torque converter clutch in response to a transmission input torque request greater than the non-zero torque capacity after adjusting the torque capacity of the torque converter clutch to provide the non-zero torque capacity.

By providing a non-zero torque capacity via a torque converter clutch, it may be possible to provide the technical result of improving driveline efficiency. For example, if a driver or controller requests a low transmission input shaft torque, the torque converter clutch may be held closed or closed, including partially closed, to increase the torque converter clutch's torque capacity. Closing the torque converter clutch allows the transfer of engine torque through the torque converter without having to transfer torque through fluid in the torque converter. Consequently, vehicle driveline efficiency may be increased and vehicle fuel consumption may decrease. Nevertheless, if the driver or controller requests an increase in transmission input torque that exceeds a threshold torque, the torque converter clutch is opened to reduce the possibility of torque converter clutch degradation and increase torque multiplication through the torque converter. In this way, the present method may increase driveline efficiency during low load vehicle launch conditions. Further, the method may provide significant launch torque during conditions of high load vehicle launch conditions.

If a vehicle does not have an infinitely variable transmission and the powertrain torque source does not have sufficient function at zero speed and sub-idle speeds, a slip element may be positioned between the powertrain torque source and drive wheels. The slip element may be either a fluid clutch (perhaps enhanced to also be a torque converter) or a friction clutch. Conventionally, a fluid clutch is used both during zero vehicle speed, initial acceleration, and some other conditions. The idea is that if the vehicle has a fluid clutch, you use it for all slip conditions. All modern conventional automatic transmission also come with a lock-up clutch to eliminate the constant power loss of the fluid clutch. Thus, the typical launch sequence becomes: 1) idle with torque converter providing creep torque at a power loss, 2) accelerate using the slip and torque multiplication of the fluid clutch/torque converter, 3) lock up torque converter clutch eliminating the constant power loss associated with the fluid clutch after achieving a threshold speed. The inventors recognize that there are light torque launches where the use of the fluid clutch can be avoided with the result being less time spent with slip elements engaged, thereby increasing powertrain efficiency. Transmission power loss occurs while slip elements are being used. Thus, for light launch, the invented launch sequence becomes: 1) idle with torque converter clutch engaged, 2) accelerate using the slip provided by engaging the forward clutch (or equivalent, such as gear clutches), 3) fully lock up torque converter clutch once the torque flow through the torque converter's fluidic torque path is not expected to be needed. In an alternate embodiment, the vehicle may launch by adjusting the torque converter lock-up clutch capacity based on accelerator pedal position, but that does not yield the "neutral idle" benefit.

The present description may provide several advantages. In particular, the approach may increase vehicle driveline efficiency. Additionally, the approach may provide an expected vehicle launch during conditions of high transmission input torque demand. Additionally, the approach may automatically control the torque converter clutch when a vehicle is stopped in response to road grade to further reduce the possibility of torque converter clutch degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
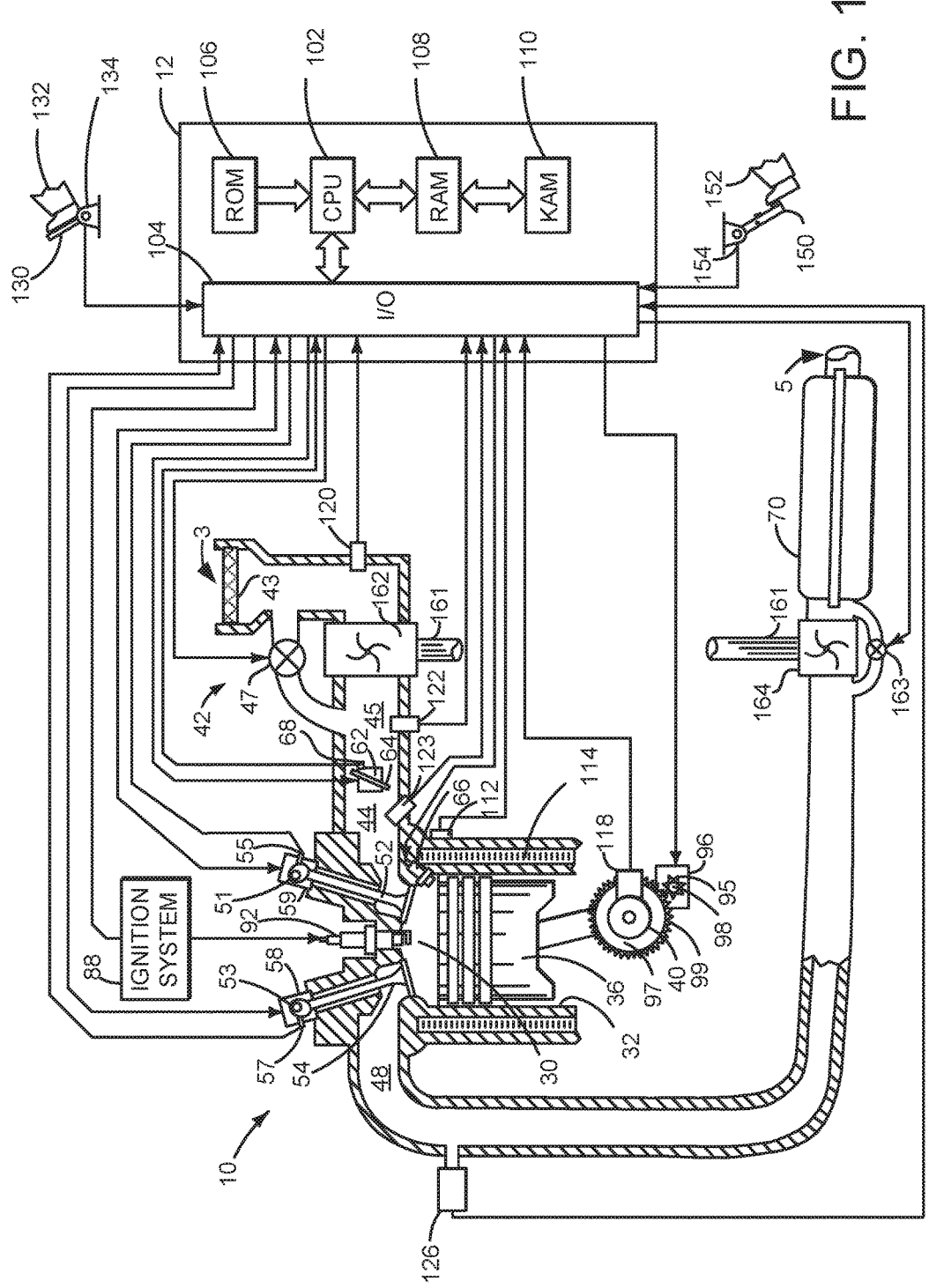
FIG. 1 shows a schematic depiction of an engine.
Figure 2:
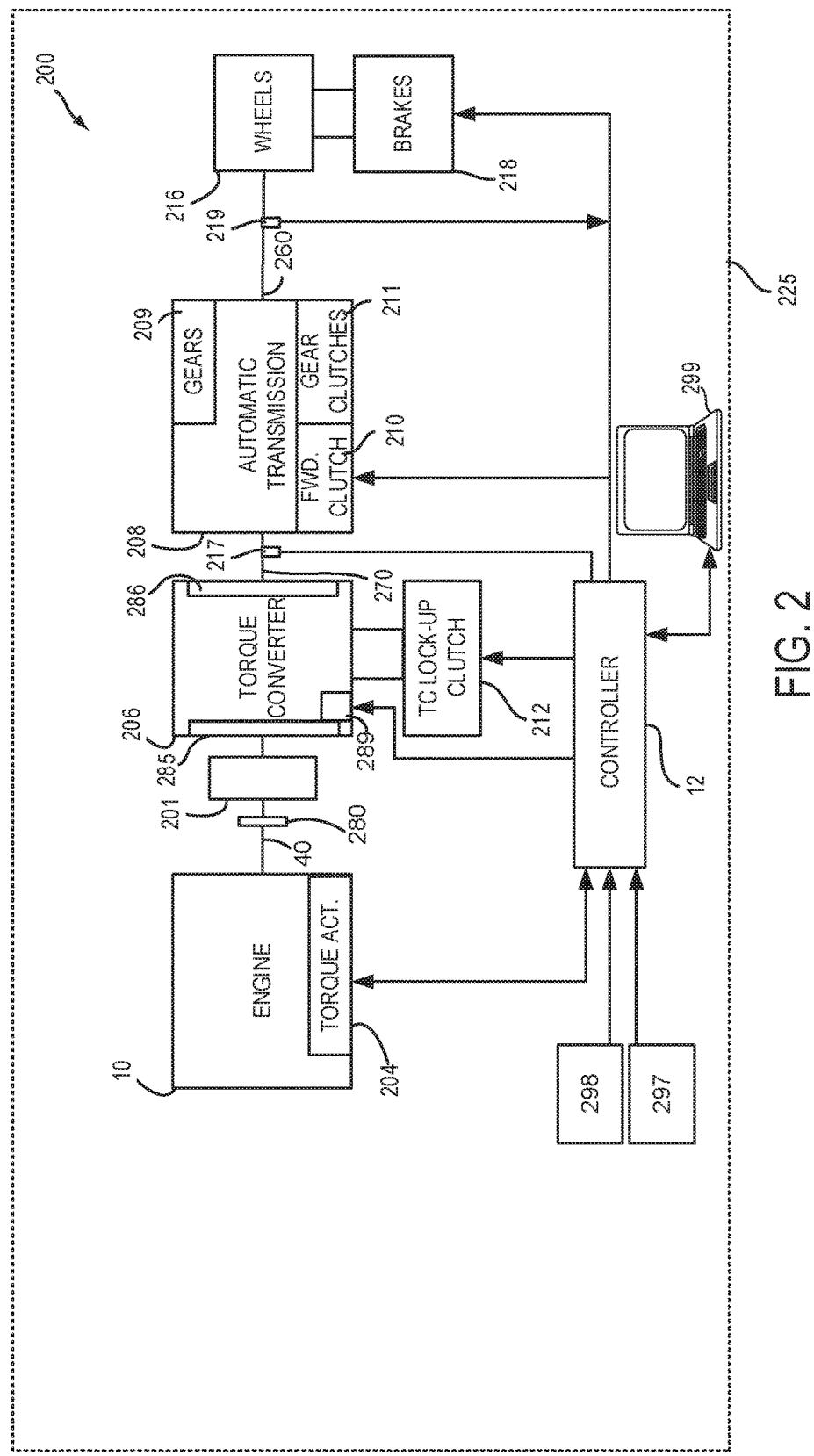
FIG. 2 shows a schematic depiction of an example vehicle powertrain including an engine.
Figure 3:
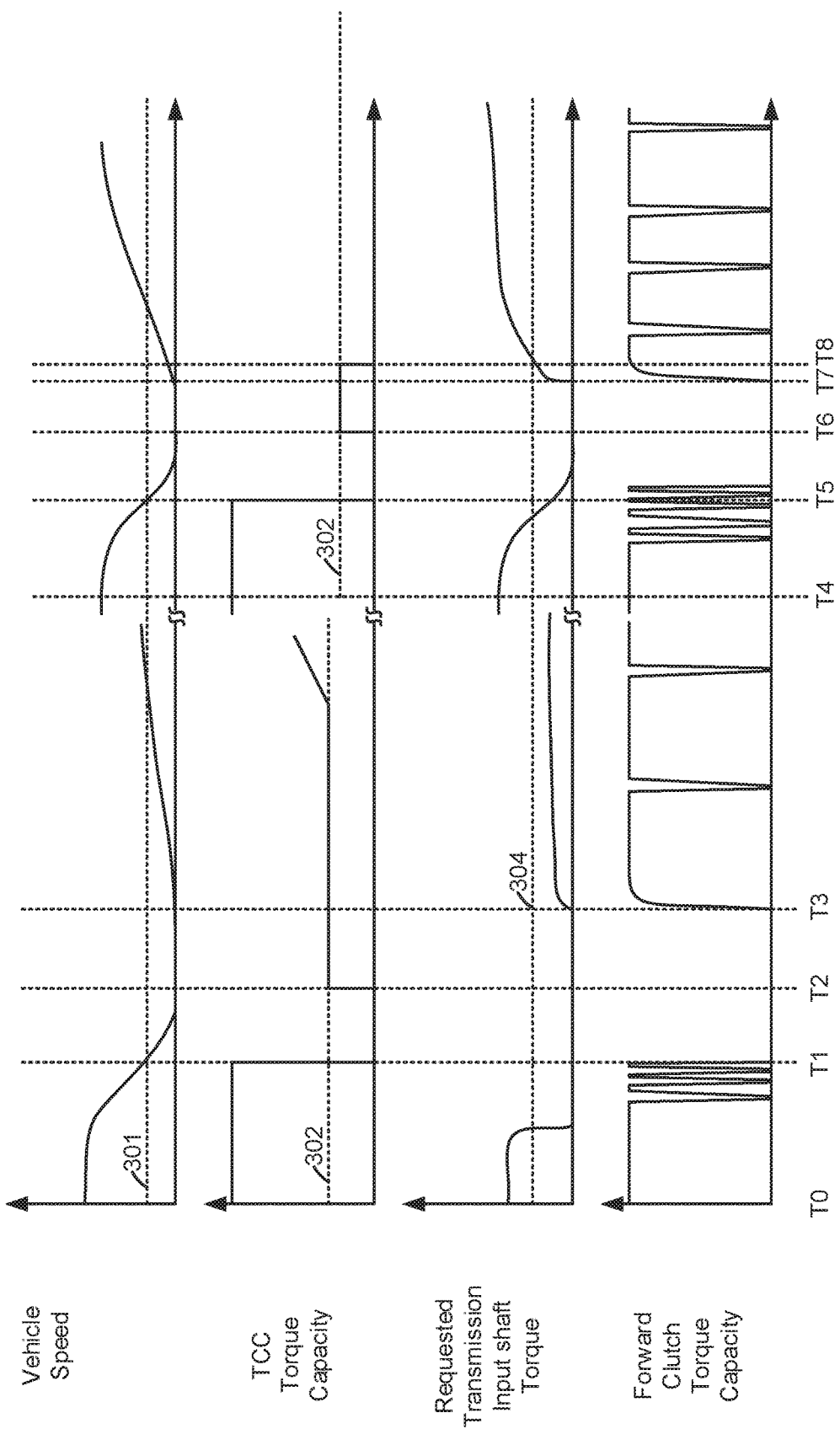
FIG. 3 shows example plots of two different vehicle launch sequences.

The present description is related to operating a vehicle powertrain that includes an engine that is coupled to a transmission that includes a torque converter. The torque converter includes a torque converter lockup clutch to bypass the torque convertor's fluidic torque path. The engine may be configured as is shown in FIG. 1. The engine of FIG. 1 may be incorporated into a vehicle powertrain as shown in FIG. 2, and the engine may be the sole or only adjustable torque source in the powertrain. Alternatively, the powertrain may include an engine and a motor/generator as is shown in FIG. 2. Two different vehicle launch sequences are shown in FIG. 3. The powertrain may be operated according to the method shown in FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 (e.g., central or engine intake manifold throttle) adjusts a position of throttle plate 64 to control air flow from compressor 162 to intake manifold 44. Pressure in boost chamber 45 may be referred to as throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162.

Air filter 43 cleans air entering engine air intake 42 via inlet 3 which is exposed to ambient temperature and pressure. Converted combustion byproducts are exhausted at outlet 5, which is exposed to ambient temperature and pressure. Thus, piston 36 and combustion chamber 30 may operate as a pump when engine 10 rotates to draw air from inlet 3 and exhaust combustion byproducts to outlet 5. Inlet 3 is upstream of outlet 5 according to a direction of flow through engine 10, exhaust manifold 48, and engine air intake 42. Upstream does not include anything outside the engine past the inlet 3, and downstream does not include anything outside the engine past the outlet 5.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 123 coupled to intake manifold 44; a measurement of engine boost pressure or throttle inlet pressure from pressure sensor 122; an engine position from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, FIG. 2 is a block diagram of a vehicle 225 including a powertrain or driveline 200. The powertrain of FIG. 2 includes engine 10 shown in FIG. 1. Engine 10 includes one or more torque actuators 204 (e.g., a throttle, camshaft, fuel injector, etc.) Powertrain 200 may be powered by engine 10. Engine crankshaft 40 is shown coupled to optional driveline disconnect clutch 280, and driveline disconnect clutch 280 is shown mechanically coupled to optional motor/generator 201 which is mechanically coupled to impeller 285 of torque converter 206. Torque converter impeller 285 is mechanically coupled to transmission pump 289. Mechanically driven transmission pump 289 supplies pressurized transmission fluid to forward transmission clutch 210 and gear clutches (e.g., gear clutches 1-10). In certain configurations, a hydraulic transmission pump may be driven by its own electric motor or by output shaft 260 to provide pressurized fluid throughout transmission 208. Torque converter 206 also includes a turbine 286 which is coupled to transmission input shaft 270. Transmission input shaft 270 mechanically couples torque converter 206 to automatic transmission 208 and its speed is monitored via speed sensor 217. Torque converter 206 also includes a torque converter bypass lock-up clutch 212 (TCC). Torque is directly transferred from impeller 285 to turbine 286 when TCC is locked closed. TCC is electrically operated by controller 12. Alternatively, TCC may be hydraulically locked closed. In one example, the torque converter may be referred to as a component of the transmission. Further, TCC may be partially closed, which provides an adjustable torque capacity for the TCC. In this partially closed mode, the friction element has a sort of torque-limiter behavior where if the clutch sees a torque level over a threshold, it slips and the fluid clutch becomes active in transmitting torque. The TCC provides a friction torque path through torque converter 206 while torque may also be transferred via fluid between impeller 206 and turbine 286. Torque transferred via fluid follows a fluidic torque path from impeller 285 to turbine 286.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output speed is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch application pressure in response to various engine operating conditions, or based on a driver-based engine operation request.

Automatic transmission 208 includes gear clutches 211 and forward clutch 210 to engage or disengage gears 209 (e.g., reverse and gears 1-10). The gear clutches 211 (e.g., 1-10) and the forward clutch 210 may be selectively engaged to propel a vehicle. Transmission 208 is configured such that one gear of gears 209 may be engaged by applying two or more of clutches 211. In other words, a gear may be positively engaged when two or more of clutches 211 are closed. Further, transmission 208 may enter a neutral state where input shaft 270 is not engaged with or coupled to output shaft 260 when one or more of clutches 211 is open but while one or more of clutches 211 are closed. Torque output from the automatic transmission 208 may be relayed to wheels 216 to propel the vehicle via output shaft 260. Speed of output shaft 260 is monitored via speed sensor 219. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal as shown in FIG. 1. In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Thus, engine 10 may be the only adjustable torque source that provides positive torque to powertrain 200. Alternatively, the driveline may include engine 10 along with motor/generator 201 as shown. Torque flows from engine 10 to transmission 208 before being applied to wheels 216. Thus, engine 10 is upstream of torque converter 206, transmission 208, and wheels 216 in a direction of power flow.

Controller 12 may be configured to receive inputs from engine 10, as shown in more detail in FIG. 1, and accordingly control a torque output of the engine and/or operation of the torque converter, transmission, clutches, and/or brakes. Further, controller 12 may receive driver input from man/machine interface 299. In some examples, man/machine interface 299 may provide powertrain information and indications to a driver. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Controller 12 may also receive vehicle position and direction information from global positioning system (GPS) receiver 297 and/or inclinometer 298. The GPS receiver may indicate the direction of vehicle travel and whether the vehicle is directed uphill or downhill. Further, the GPS data may be used to index maps stored in the GPS or controller 12 to indicate road grade at the vehicle's present position. Alternatively, or in addition, road grade may be determined from inclinometer 298. Further, vehicle situational awareness may be used to identify likely low torque or high torque launches. Traffic conditions, towed loads, road surface slipperiness may give insight into the likely torque level required. High torque requirements are best addressed by going rapidly to a torque converter fluidic torque path vehicle launch and low torque requirements are best addressed by using a friction clutch vehicle launch (instead of a torque convert launch with later friction clutch locked-up to reduce torque converter losses).

Referring now to FIG. 3, plots of two different prophetic vehicle launch sequences is shown. The plots are aligned in time. The sequences may be provided by the system of FIGS. 1 and 2 according to the method of FIG. 4. Vertical markers T0-T8 represent times of particular interest in the sequence. The double SSs along the horizontal axes of each plot represent breaks in time. The break in time may be long or short in duration.

The first plot from the top of FIG. 3 is a plot of vehicle speed versus time. The vertical axis represents vehicle speed and vehicle speed increases in the direction of the vertical axis arrow. The horizontal axis represents time and time increases from the left side of FIG. 3 to the right side of FIG. 3. The horizontal line 301 represents a threshold vehicle speed below which the TCC may be fully opened and vehicle brakes may be applied.

The second plot from the top of FIG. 3 is a plot of torque converter clutch (TCC) torque capacity versus time. The vertical axis represents TCC clutch torque capacity and TCC clutch torque capacity increases in the direction of the vertical axis arrow. The horizontal axis represents time and time increases from the left side of FIG. 3 to the right side of FIG. 3. The horizontal line 302 represents a non-zero TCC torque capacity that the TCC is adjusted to for launching a vehicle. The TCC torque capacity for launching the vehicle is adjustable based on vehicle operating conditions. For example, the TCC torque capacity for launching the vehicle may be reduced or increased in response to a transmission temperature. Specifically, the TCC torque capacity for launching the vehicle may be reduced in response to a transmission temperature greater than a threshold. Similarly the TCC torque capacity for launching the vehicle may be increased in response to the transmission temperature being less than the threshold. TCC torque capacity is a maximum amount of torque the TCC may transmit from one side (e.g., input side, which is coupled to a torque source such as an engine or motor/generator) of the TCC to the other side (e.g., output side, which is coupled to a transmission input shaft) of the TCC when a particular TCC closing force is applied to the closed TCC. The torque capacity may be determined by the controller based on operating parameters, such as those noted herein. The torque capacity may include a variable degree of torque transmission through the clutch at the current torque converter input and output speeds. The TCC closing force may be based on a pressure of hydraulic fluid supplied to the TCC, an electrical voltage applied to the TCC, or other attribute of a force transfer medium. The TCC torque capacity may be decreased then increased during transmission gear shifting to smooth transmission shifting. The actual torque transmitted through the torque converter clutch may maintained below the clutch capacity to avoid degraded performance.

The third plot from the top of FIG. 3 is a plot of requested transmission input shaft torque versus time. The vertical axis represents requested transmission input shaft torque and requested transmission input shaft torque increases in the direction of the vertical axis arrow. The horizontal axis represents time and time increases from the left side of FIG. 3 to the right side of FIG. 3. In one example, the requested transmission input shaft torque may be based on a position of an accelerator pedal and vehicle speed. For example, accelerator pedal position and vehicle speed may index a table or function of empirically determined values of requested transmission input shaft torque. The table outputs a value based on the accelerator pedal position and the vehicle speed. The requested transmission input shaft torque may be provided solely by an engine, the engine and a motor/generator, or solely via the motor/generator. Horizontal line 304 is a transmission input torque level below which the TCC may be closed to provide the non-zero torque capacity for launching a vehicle. If the requested transmission torque during a vehicle launch is greater than threshold 304, the TCC may be opened.

The fourth plot from the top of FIG. 3 is a plot of forward clutch torque capacity versus time. The vertical axis represents forward clutch torque capacity and forward clutch torque capacity increases in the direction of the vertical axis arrow. The horizontal axis represents time and time increases from the left side of FIG. 3 to the right side of FIG. 3.

At time T0, the vehicle speed is at a medium level and the TCC torque capacity is at a higher level. The requested transmission input torque is a medium level and the forward clutch torque capacity is at a higher level.

Between time T0 and time T1, the vehicle speed begins to decrease in response to the requested transmission input shaft torque decreasing. The TCC torque capacity remains at a higher level and the forward clutch torque capacity decreases and increases in response to the transmission downshifting through gears.

At time T1, the TCC torque capacity is reduced to zero by opening the TCC in response to vehicle speed being within a threshold speed of vehicle speed being zero. The requested transmission input shaft torque is near zero and the forward clutch torque capacity is adjusted to zero. The vehicle brakes are also applied (not shown).

Between time T1 and time T2, the vehicle speed reaches zero and the vehicle is stopped. The TCC torque capacity is zero so engine torque is not transferred through the TCC. The requested transmission input torque is zero and the forward clutch torque capacity is zero. The applied vehicle brakes stop the vehicle from moving (not shown).

Alternatively, the torque converter clutch may be partially applied and the transmission may be shifted into neutral, which is exactly what is done at T2.

At time T2, the TCC torque capacity is increased in response to the forward clutch capacity being reduced to within a threshold torque of zero (e.g., less than 20 N-m of torque capacity in the forward clutch). The TCC torque capacity is increased to threshold 302 so that engine torque may be transferred through the friction torque path (e.g., through the TCC and forward clutch) during vehicle launch (e.g., increase in requested transmission input shaft torque while vehicle speed is zero or a creep speed, the creep speed a speed the vehicle travels at after the vehicle is stopped and then the vehicle brakes are released without applying the accelerator pedal). At T2, this configuration is known as neutral idle because the engine is idling but without providing a creep torque to the vehicle wheels, thus reducing fuel consumption at idle.

At time T3, the requested transmission input shaft torque is increased while the TCC torque capacity is at level 302. The forward clutch capacity is increased to transfer engine torque to the vehicle wheels to propel the vehicle. Vehicle speed begins increasing and the TCC remains applied, though not locked (e.g., allowing less than 40 RPM slip between the torque converter impeller and turbine). The requested transmission input shaft torque remains below threshold 304 so that the TCC remains closed such that the TCC torque capacity is at the level of 302. The torque represented by 304 may be a same level of torque as 302. Launching the vehicle with the TCC closed may increase driveline efficiency and conserve fuel. The first vehicle launch sequence ends at the time break indicated by the double SS. Forward clutch torque capacity is increased to actually control the launch. This torque capacity is lower than that of the torque converter clutch. Thus, slip may occur at the forward clutch instead of across the torque converter clutch. While the possibility of torque converter torque multiplication is not possible with a friction torque converter clutch launch, it avoids use of the torque converter fluidic torque path (and it losses) which then must be subsequently locked with a friction clutch.

At time T4, the vehicle speed is at a medium level and the TCC torque capacity is at a higher level. The requested transmission input torque is a medium level and the forward clutch torque capacity is at a higher level.

Between time T4 and time T5, the vehicle speed begins to decrease in response to the requested transmission input shaft torque decreasing. The TCC torque capacity remains at a higher level and the forward clutch torque capacity decreases and increases in response to the transmission downshifting through gears.

At time T5, the TCC torque capacity is reduced to zero by opening the TCC in response to vehicle speed being within a threshold speed of vehicle speed being zero. The requested transmission input shaft torque is near zero and the forward clutch torque capacity is adjusted to zero. The vehicle brakes are also applied (not shown).

Between time T5 and time T6, the vehicle speed reaches zero and the vehicle is stopped. The TCC torque capacity is zero so engine torque is not transferred through the TCC. The requested transmission input torque is zero and the forward clutch torque capacity is zero. The applied vehicle brakes stop the vehicle from moving (not shown).

At time T6, the TCC torque capacity is increased in response to the forward clutch capacity being reduced to within a threshold torque of zero (e.g., less than 20 N-m of torque capacity in the TCC). The TCC torque capacity is increased to threshold 302 so that engine torque may be transferred through the friction torque path during vehicle launch. The threshold 302 is reduced as compared to the level of threshold 302 at time T1. The threshold 302 may be adjusted based on a transmission temperature or other condition. This mode is functionally equivalent to neutral idle.

At time T7, the requested transmission input shaft torque is increased while the TCC torque capacity is at level 302. The forward clutch capacity is increased to transfer engine torque to the vehicle wheels to propel the vehicle. Vehicle speed begins increasing and the TCC remains applied, though not locked. The requested transmission input shaft torque remains below threshold 304 so that the TCC remains closed such that the TCC torque capacity is at the level of 302.

At time T8, the requested transmission input shaft torque exceeds threshold 304. As a result that clutch starts slipping. At this point, it may be desirable for the torque converter lock-up clutch to completely open and the torque converter not only to transmit torque but multiply it. As a result, the TCC torque capacity is reduced via opening the TCC. The TCC may be partially or fully opened in response to the requested transmission input shaft torque exceeding threshold 304. In this example, the TCC is fully opened so that the TCC torque capacity is substantially zero (e.g., less than 5% of the TCCs torque capacity when a rated pressure or force is applied to the TCC). By reducing the TCC torque capacity, torque converter torque multiplication may be increased and TCC slippage (e.g., speed difference between TCC torque input and TCC torque output) of the TCC may be increased to reduce the possibility of TCC degradation.

Thus, the TCC may be controlled to improve vehicle launch by being at least partially closed where the TCC has capacity to transfer a threshold amount of torque to improve torque converter efficiency during a low torque demand vehicle launch. Alternatively, the TCC may be opened to reduce the possibility of TCC degradation during a high torque demand vehicle launch so as to increase torque converter torque multiplication and increase engine torque delivered to vehicle wheels. The particularly inventive feature here is to treat the TCC as a sort of torque fuse where once its transmittable torque level is exceeded; it naturally progresses in transmitting and multiplying torque via torque converter action. The only control action that needs to be taken is that once a threshold amount of TCC slippage is measured, that the TCC is promptly unloaded. This feature makes the transition between what may have started as a light launch and progressed into a heavy launch a progression that is straightforward to control. And, if the controller has information that would indicate the likeliness of high torque acceleration, then the controller may move to fluidic launch control (e.g., transmission in-gear, torque converter clutch open).

Figure 4:
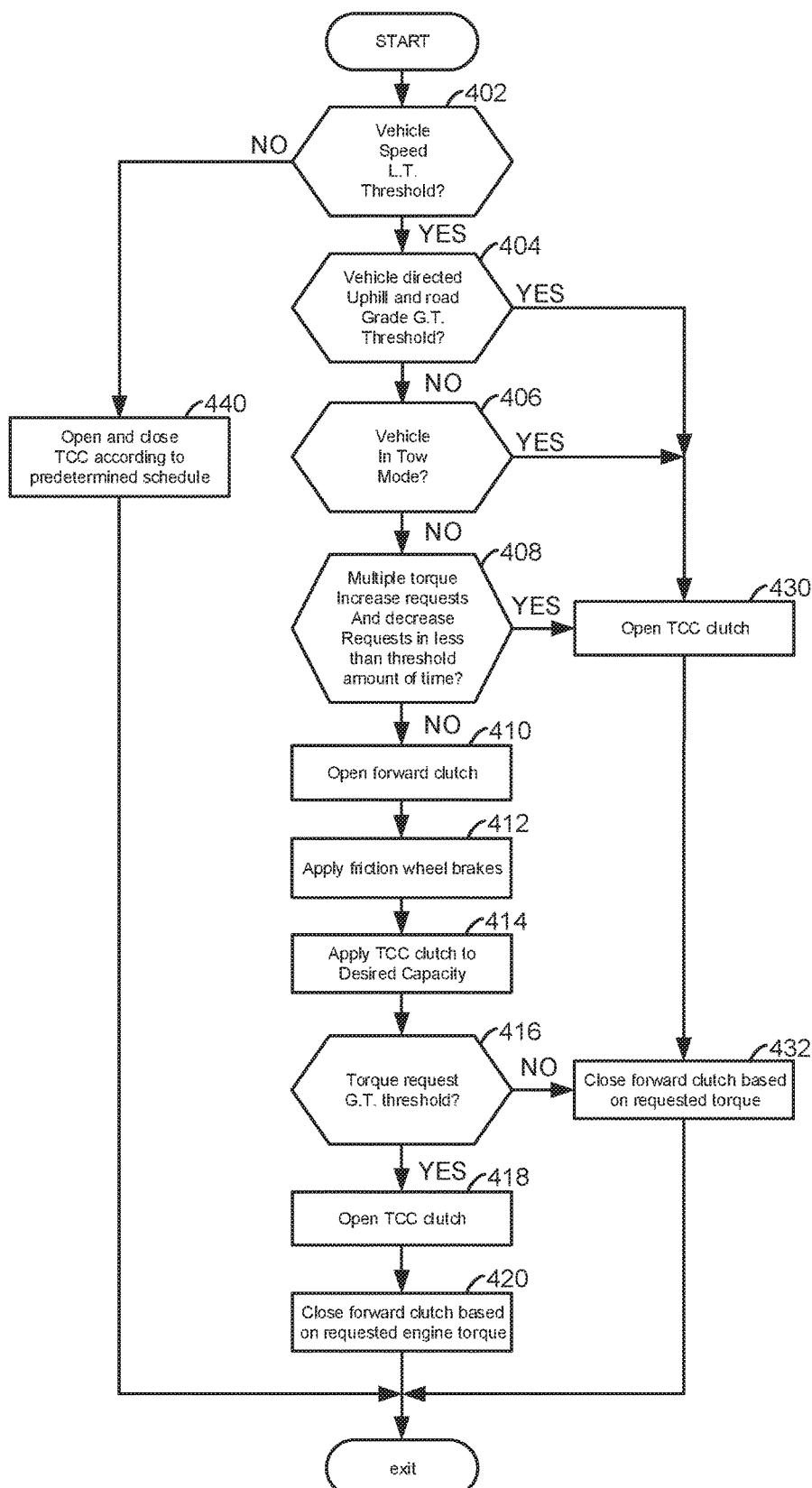
FIG. 4 shows an example method for operating a vehicle driveline.

Referring now to FIG. 4, a method for operating a vehicle driveline or powertrain is shown. The method of FIG. 4 may be applied to the powertrain shown in FIG. 1. Further, at least portions of the method of FIG. 4 may be included as executable instructions in the system of FIGS. 1 and 2. And, at least portions of the method of FIG. 4 may be actions taken within the physical world to transform states of a TCC, vehicle gears, and other engine and transmission components.

At 402, method 400 judges if a vehicle speed is less than a threshold speed. Vehicle speed may be determined via a transmission speed sensor or vehicle wheel sensors. If method 400 judges that the vehicle speed is less than a threshold speed (e.g., less than 8 KPH), the answer is yes and method 400 proceeds to 404. Otherwise the answer is no and method 400 proceeds to 440.

At 440, method 400 opens and closes the TCC according to a first predetermined TCC schedule. For example, the TCC may be opened at a beginning of a gear shift and closed after the gear shift is complete. Method 400 proceeds to exit after the TCC is operated according to a first schedule.

At 404, method 400 judges if the vehicle is directed uphill and operating on a road with a grade greater than a threshold. In one example, the vehicle direction and road grade may be determined via a GPS system. If method 400 judges that the vehicle is directed uphill and road grade at the vehicle's present position is greater than a threshold, the answer is yes and method 400 proceeds to 430. Otherwise, the answer is no and method 400 proceeds to 406.

At 430, method 400 opens the TCC. The TCC may be fully opened or substantially fully opened (e.g., opened to that the TCC has less than 5% of the TCCs torque capacity when a rated pressure or force is applied or released to fully open the TCC) so that the TCCs torque capacity is reduced to zero or near zero. By reducing the TCCs torque capacity, torque may be transferred from the vehicle's engine to the vehicle's transmission input shaft via fluid flowing between the torque converter impeller and the torque converter turbine rather than through the TCCs friction plates. Method 400 proceeds to 432.

At 432, method 400 closes the transmission forward clutch if the forward clutch is open. By closing the forward clutch, the engine torque may be transferred to the vehicle wheels to propel the vehicle. However, since the TCC is open, engine speed may have to reach a threshold speed before the torque converter transfers engine torque to the transmission to launch the vehicle. Method 400 proceeds to exit.

At 406, method 400 judges if the vehicle is in a tow or haul or sport mode. In one example, the vehicle may be in a tow or haul mode when a driver selects tow or haul mode using a human/machine interface. In tow or haul mode, the transmission gears upshift at higher vehicle speeds and transmission input torque levels than base transmission gear shifting. Additionally, the transmission downshift higher engine speeds than base transmission gear shifting. The torque converter clutch may also be locked according to a second predetermined schedule that is different from the first schedule. If method 400 judges that the vehicle is in tow or haul mode, the answer is yes and method 400 proceeds to 430. Otherwise, the answer is no and method 400 proceeds to 408. Being in tow or haul mode indicates that a higher amount of torque may be used to launch the vehicle. Therefore, it may be desirable to launch the vehicle with the TCC open to reduce the possibility of degradation of any of the friction clutches.

At 408, method 400 judges if multiple transmission input shaft torque increases and transmission input shaft torque decreases have occurred within a predetermined amount of time. For example, method 400 may judge if the transmission input shaft torque has increased twice and the transmission input shaft torque has decreased twice in less than 5 seconds while vehicle speed is less than the threshold. If method 400 judges that a plurality or multiple transmission input shaft torque increases and transmission input shaft torque decreases have occurred within a predetermined amount of time, the answer is yes and method 400 proceeds to 430. Otherwise, the answer is no and method 400 proceeds to 410. In this way, the TCC may be opened to reduce friction clutch heating and degradation.

At 410, method 400 opens the transmission forward clutch. The forward clutch may be fully opened or opened to provide less than a threshold amount of torque capacity for the forward clutch (e.g., less than 5% of the maximum forward clutch torque capacity when a rated pressure or force is applied to fully close the forward clutch). The forward clutch is opened so that the TCC may be closed without delivering engine torque to the vehicle's wheels. Method 400 proceeds to 412 after opening the forward clutch.

At 412, method 400 applies friction brakes to the vehicle's wheels to reduce vehicle motion. Thus, the brakes are applied so that the vehicle may remain stationary until the driver increases the transmission input shaft torque request. Method 400 proceeds to 414 after vehicle brakes are applied.

At 414, method 400 at least partially closes the TCC to provide a desired TCC torque capacity. The desired TCC torque capacity is greater than zero and it may be varied based on vehicle operating conditions. Further, in one example, the TCC torque capacity is a torque sufficient to launch the vehicle from zero speed to a threshold speed in a predetermined amount of time. For example, the TCC torque capacity may be increased to 100 N-m via at least partially closing the TCC. In one example, the TCC capacity is adjusted to a non-zero torque capacity that is a capacity sufficient to accelerate the vehicle to a desired speed in a threshold amount of time. Method 400 proceeds to 416.

At 416, method 400 judges if the transmission input shaft torque request is greater than a threshold. In other examples, the torque request may be an engine torque request, a motor torque request, or a sum of engine and motor torque requests. If method 400 judges that the torque request is greater than the threshold, the answer is yes and method 400 proceeds to 418. Otherwise, the answer is no and method 400 proceeds to 432.

At 418, method 400 opens the TCC. The TCC may be fully opened or substantially fully opened (e.g., opened to that the TCC has less than 5% of the TCCs torque capacity when a rated pressure or force is applied or released to fully open the TCC) so that the TCCs torque capacity is reduced to zero or near zero. By reducing the TCCs torque capacity, torque may be transferred from the vehicle's engine to the vehicle's transmission input shaft via fluid flowing between the torque converter impeller and the torque converter turbine rather than through the TCCs friction plates. Method 400 proceeds to 420.

At 420, method 400 closes the transmission forward clutch responsive to the requested transmission input shaft torque. For example, if the requested transmission torque is increased, the additional pressure or force may be applied to close the forward clutch, thereby increasing the forward clutch's torque capacity responsive to the requested transmission torque. As a result, torque to the vehicle's wheels increases as the transmission input shaft torque request increases and the vehicle may launch from a lower vehicle speed to a higher vehicle speed.

In this way, the TCC may be controlled to transfer engine torque via a friction path during low transmission input shaft torque requests. The TCC may be controlled to release during high transmission input shaft torque requests so that engine torque is transferred via a hydraulic torque path between the torque converter impeller and the torque converter turbine where transmission fluid is the torque transfer medium. It should also be noted that the TCC may transfer only engine torque if the vehicle is configured with the engine as the sole torque source in the driveline. Alternatively, the TCC may transfer motor torque and/or engine torque to launch the vehicle according to the method of FIG. 4.

Thus, the method of FIG. 4 provides for a method for operating a vehicle driveline, comprising: adjusting a torque capacity of a torque converter clutch to provide a non-zero torque capacity in response to a vehicle speed of zero; and opening the torque converter clutch in response to a transmission input torque request greater than the non-zero torque capacity after adjusting the torque capacity of the torque converter clutch to provide the non-zero torque capacity. The method further comprises applying vehicle wheel brakes in response to the vehicle speed being less than the threshold and a driver requested torque being less than a threshold while the torque capacity of the torque converter is adjusted to the non-zero torque capacity. The method further comprises fully opening the torque converter clutch in response to a predetermined actual total number of accelerator pedal applications and releases after adjusting the torque capacity of the torque converter clutch to provide the non-zero torque capacity.

In some examples, the method includes where the predetermined actual total number of accelerator pedal applications and releases occur with a threshold amount of time of each other, and wherein the non-zero torque capacity is a torque capacity sufficient to allow the vehicle to accelerate to a desired speed in a threshold amount of time. The method includes where the transmission input torque request is based on accelerator pedal position. The method further comprises adjusting the torque capacity of the torque converter clutch to provide the non-zero torque capacity in further response to the transmission input torque request being less than a threshold. The method further comprises adjusting the torque capacity of the torque converter clutch in further response to a vehicle in which the torque converter resides being in a towing mode.

In some examples, the method of FIG. 4 provides for a method for operating a vehicle driveline, comprising: adjusting a torque capacity of a torque converter clutch to provide a torque capacity in response to vehicle speed being less than a threshold, where the torque capacity is non-zero in response to a vehicle in which the torque converter clutch resides being directed downhill. The method includes where the torque capacity of the torque converter clutch is substantially zero in response to the vehicle being directed uphill on a road having a grade greater than a threshold. The method further comprises adjusting the torque capacity of the torque converter clutch to substantially zero in response to the vehicle being in a tow mode and directed downhill. The method further comprises further adjusting the torque capacity of the torque converter clutch to provide substantially zero torque capacity in response to a plurality of torque increase requests and torque decrease requests within less than a threshold amount of time.

In some examples, the method further comprises automatically applying vehicle brakes in response to the vehicle speed being less than the threshold. The method further comprises opening a forward clutch of the transmission in response to the vehicle speed being less than the threshold. The method further comprises closing the forward clutch in response to an increase in a desired transmission input torque.

The method of FIG. 4 also provides for a method for operating a vehicle driveline, comprising: during launch of a vehicle, providing a predetermined constant non-zero torque converter clutch capacity, and closing a forward clutch of a transmission in response to an increase in a requested transmission input torque; and increasing engine output torque in response to the requested transmission input torque while proving the predetermined non-zero torque converter clutch capacity. The method includes where the predetermined non-zero torque converter clutch capacity is provided via closing a torque converter clutch. The method further comprises decreasing the predetermined non-zero converter clutch capacity in response to a transmission input torque being greater than a threshold.

In some examples, the method further comprises decreasing the predetermined non-zero converter clutch capacity in response to a transmission input torque being greater than a threshold. The method further comprises decreasing the predetermined non-zero converter clutch capacity in response to a plurality of transmission input torque increase requests and decrease requests. The method further comprises decreasing the predetermined non-zero converter clutch capacity in response to the vehicle entering a tow mode.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware to manipulate operating states of the various devices disclosed. As will be appreciated by one of ordinary skill in the art, the methods described in FIG. 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating a driveline of a vehicle, comprising:
adjusting a torque capacity of a torque converter clutch to provide a non-zero torque capacity in response to a vehicle speed of zero; and
opening the torque converter clutch in response to a transmission input torque request greater than the non-zero torque capacity after adjusting the torque capacity of the torque converter clutch to provide the non-zero torque capacity.

2. The method of claim 1, further comprising automatically applying vehicle wheel brakes in response to the vehicle speed being less than the threshold and a driver requested torque being less than a threshold while the torque capacity of the torque converter clutch is adjusted to the non-zero torque capacity.

3. The method of claim 1, further comprising fully opening the torque converter clutch in response to a predetermined actual total number of accelerator pedal applications and releases after adjusting the torque capacity of the torque converter clutch to provide the non-zero torque capacity.

4. The method of claim 3, where the predetermined actual total number of accelerator pedal applications and releases occur with a threshold amount of time of each other, and wherein the non-zero torque capacity is a torque capacity sufficient to allow the vehicle to accelerate the vehicle to a desired speed in a threshold amount of time.

5. The method of claim 1, where the transmission input torque request is based on accelerator pedal position.

6. The method of claim 1, further comprising adjusting the torque capacity of the torque converter clutch to provide the non-zero torque capacity in further response to the transmission input torque request being less than a threshold.

7. The method of claim 1, further comprising adjusting the torque capacity of the torque converter clutch in further response to the vehicle being in a towing mode.

8. A method for operating a vehicle driveline, comprising:
adjusting a torque capacity of a torque converter clutch to provide a torque capacity in response to vehicle speed being less than a threshold, where the torque capacity is non-zero in response to a vehicle in which the torque converter clutch resides being directed downhill.

9. The method of claim 8, where the torque capacity of the torque converter clutch is substantially zero in response to the vehicle being directed uphill on a road having a grade greater than a threshold.

10. The method of claim 8, further comprising adjusting the torque capacity of the torque converter clutch to substantially zero in response to the vehicle being in a tow mode and directed downhill.

11. The method of claim 8, further comprising further adjusting the torque capacity of the torque converter clutch to provide substantially zero torque capacity in response to a plurality of torque increase requests and torque decrease requests within less than a threshold amount of time.

12. The method of claim 8, further comprising automatically applying vehicle brakes in response to the vehicle speed being less than the threshold.

13. The method of claim 8, further comprising opening a forward clutch of the transmission in response to the vehicle speed being less than the threshold.

14. The method of claim 13, further comprising closing the forward clutch in response to an increase in a desired transmission input torque.

15. A method for operating a vehicle driveline, comprising:

during launch of a vehicle, providing a predetermined constant non-zero torque converter clutch capacity, and closing a forward clutch of a transmission in response to an increase in a requested transmission input torque; and increasing engine output torque in response to the requested transmission input torque while proving the predetermined non-zero torque converter clutch capacity.

16. The method of claim 15, where the predetermined non-zero torque converter clutch capacity is provided via closing a torque converter clutch.

17. The method of claim 15, further comprising decreasing the predetermined non-zero converter clutch capacity in response to a transmission input torque being greater than a threshold.

18. The method of claim 15, further comprising decreasing the predetermined non-zero converter clutch capacity in response to a transmission input torque being greater than a threshold.

19. The method of claim 18, further comprising decreasing the predetermined non-zero converter clutch capacity in response to a plurality of transmission input torque increase requests and decrease requests.

20. The method of claim 15, further comprising decreasing the predetermined non-zero converter clutch capacity in response to the vehicle entering a tow mode.

* * * * *